United States Patent
Brady et al.

(10) Patent No.: US 6,441,740 B1
(45) Date of Patent: Aug. 27, 2002

(54) RADIO FREQUENCY IDENTIFICATION TRANSPONDER HAVING A REFLECTOR

(75) Inventors: Michael John Brady, Brewster; Dah-Weih Duan, Yorktown Heights; Venkata S. R. Kodukula, Yorktown Heights; Paul Andrew Moskowitz, Yorktown Heights, all of NY (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/259,745

(22) Filed: Feb. 27, 1999

Related U.S. Application Data (60) Provisional application No. 60/076,364, filed on Feb. 27, 1998.

(51) Int. Cl.[7] ............................................. G08B 13/14
(52) U.S. Cl. ............................ 340/572.7; 340/572.4; 340/572.8
(58) Field of Search .................. 340/571, 572.1, 340/572.2, 572.4, 572.5, 572.8, 573.1, 573.4, 573.7, 686.1, 686.6, 10.1, 10.4, 10.2, 870.01; 343/711, 713, 754, 755, 761, 781 R, 781 P, 782

(56) References Cited

U.S. PATENT DOCUMENTS

| | | | | |
|---|---|---|---|---|
| 3,763,493 A | * | 10/1973 | Shimada et al. | 343/755 |
| 4,075,632 A | * | 2/1978 | Baldwin et al. | 340/870.01 |
| 4,360,810 A | | 11/1982 | Landt | 342/44 |
| 4,504,836 A | * | 3/1985 | Seavey | 343/761 |
| 4,782,345 A | | 11/1988 | Landt | 343/727 |
| 4,786,907 A | | 11/1988 | Koelle | 342/51 |
| 4,816,389 A | | 3/1989 | Sansonetti et al. | 435/6 |
| 4,835,377 A | | 5/1989 | Brown | 235/492 |
| 4,853,705 A | | 8/1989 | Landt | 343/803 |
| 4,864,158 A | | 9/1989 | Koelle et al. | 327/31 |
| 4,888,591 A | | 12/1989 | Landt et al. | 342/44 |
| 4,897,151 A | * | 1/1990 | Killackey et al. | 216/26 |
| 4,965,869 A | * | 10/1990 | Fortney | 343/781 |
| 4,999,636 A | | 3/1991 | Landt et al. | 342/90 |
| 5,030,807 A | | 7/1991 | Landt et al. | 235/375 |
| 5,055,659 A | | 10/1991 | Hendrick et al. | 340/10.51 |
| 5,164,732 A | * | 11/1992 | Brockelsby et al. | 340/10.2 |
| 5,392,049 A | * | 2/1995 | Gunnarsson | 340/686.6 |
| 5,479,160 A | | 12/1995 | Koelle | 340/825.7 |
| 5,485,520 A | | 1/1996 | Chaum et al. | 705/74 |
| 5,504,485 A | | 4/1996 | Landt et al. | 342/42 |
| 5,510,795 A | | 4/1996 | Koelle | 342/114 |

(List continued on next page.)

FOREIGN PATENT DOCUMENTS

| | | | | |
|---|---|---|---|---|
| EP | 0 294 963 | | 12/1988 | |
| EP | 0 646 983 | | 4/1995 | |
| JP | 7-312567 | * | 11/1995 | H04B/1/38 |
| WO | WO 98/16070 | | 4/1998 | |

OTHER PUBLICATIONS

"Multifunction Credit Card Package" IBM Technical Disclosure Bulletin, vol. 38, No. 08, Aug. 1995, p. 17.

"As Low–Power CMOS Integrated Circuit for Field–Powered Radio Frequency Identification Tag" By Friedman et al., 1997 IEEE International Solid State Circuits Conference, Paper SA 17.5, pp. 294, 295, 474.

Primary Examiner—Van Trieu
(74) Attorney, Agent, or Firm—O'Melveny & Meyer LLP

(57) ABSTRACT

An improved radio frequency transponder has a reflector to increase its operative range. A system of one or more reflectors is operatively associated with a transponder and may be formed out of any sort of radio frequency reflective material. The reflector system can enhance reception or transmission of radio waves by or from the transponder. The reflector system may also be used to provide for selective coupling of the radio frequency transponder with a base station, user- or vehicle-supported reader, or the like based on relative orientation. In addition, the reflector system may be used to selectively reflect particular radio waves.

14 Claims, 6 Drawing Sheets

U.S. PATENT DOCUMENTS

| | | |
|---|---|---|
| 5,521,601 A | 5/1996 | Kandlur et al. ............... 342/44 |
| 5,528,222 A | 6/1996 | Moskowitz et al. ..... 340/572.7 |
| 5,538,803 A | 7/1996 | Gambino et al. .... 428/694 TM |
| 5,550,547 A | 8/1996 | Chan et al. .................... 342/42 |
| 5,552,778 A | 9/1996 | Schrott et al. ......... 340/825.36 |
| 5,554,974 A | 9/1996 | Brady et al. ............. 340/572.6 |
| 5,563,583 A | 10/1996 | Brady et al. ............. 340/572.2 |
| 5,565,847 A | 10/1996 | Gambino et al. ........ 340/572.6 |
| 5,606,323 A | 2/1997 | Heinrich et al. ......... 340/10.34 |
| 5,635,693 A | 6/1997 | Benson et al. ........... 340/10.33 |
| 5,673,037 A | 9/1997 | Cesar et al. ............. 340/10.37 |
| 5,680,106 A | 10/1997 | Schrott et al. ........... 340/10.33 |
| 5,682,143 A | 10/1997 | Brady et al. ............. 340/572.7 |
| 5,686,928 A * | 11/1997 | Pritchett et al. ............ 343/711 |
| 5,714,937 A * | 2/1998 | Campana, Jr. ........... 340/573.1 |
| 5,729,201 A | 3/1998 | Jahnes et al. ............. 340/572.1 |
| 5,729,697 A | 3/1998 | Schkolnick et al. .......... 705/23 |
| 5,736,929 A | 4/1998 | Schrott et al. ........... 340/572.1 |
| 5,737,710 A | 4/1998 | Anthonyson .................... 701/1 |
| 5,739,754 A | 4/1998 | Schrott et al. ........... 340/572.2 |
| 5,767,789 A | 6/1998 | Afzali-Ardakani et al. 340/10.1 |
| 5,771,021 A | 6/1998 | Veghte et al. ........ 343/700 MS |
| 5,777,561 A | 7/1998 | Chieu et al. ............. 340/10.32 |
| 5,786,626 A | 7/1998 | Brady et al. ................. 257/673 |
| 5,812,065 A | 9/1998 | Schrott et al. ........... 340/10.34 |
| 5,821,859 A | 10/1998 | Schrott et al. ........... 340/572.6 |
| 5,825,329 A | 10/1998 | Veghte et al. ........ 343/700 MS |
| 5,826,328 A | 10/1998 | Brady et al. ................... 29/827 |
| 5,828,318 A | 10/1998 | Cesar .................... 340/825.69 |
| 5,828,693 A | 10/1998 | Mays et al. ................. 375/136 |
| 5,831,532 A | 11/1998 | Gambino et al. ........ 340/572.1 |
| 5,850,181 A | 12/1998 | Heinrich et al. ......... 340/572.1 |
| 5,850,187 A | 12/1998 | Carrender et al. ......... 340/10.6 |
| 5,874,902 A | 2/1999 | Heinrich et al. ......... 340/10.51 |
| 5,986,382 A * | 11/1999 | Nysen .................... 310/313 D |

\* cited by examiner

RADIO FREQUENCY IDENTIFICATION TRANSPONDER HAVING A REFLECTOR

CROSS-REFERENCE TO RELATED APPLICATION

The present application claims priority pursuant to 35 U.S.C. 119(e) based on the following U.S. Provisional Application: Application No. 60/076,364 filed Feb. 27, 1998, the disclosure and drawing of which are hereby incorporated herein by reference.

BACKGROUND OF THE INVENTION

The present invention relates generally to radio frequency (RF) transponders such as radio frequency identification (RFID) transponders, and more specifically to a radio frequency identification transponder having a reflector.

Radio Frequency Identification has become an important information transfer system. From inventory management to automotive toll debiting, radio frequency identification systems have been utilized to transmit data in a variety of applications. RFID systems utilize an RF transmitter-receiver unit (base station or interrogator) to query an RF transponder, typically referred to as a tag, located at a distance. In some applications, the RF tag detects the interrogating signal and transmits a response signal comprising encoded data back to the interrogating unit. In this case, RFID systems have significant advantages e.g. in comparison to optical indicia readers. One example is the increased amount of data a radio frequency transponder may transmit. As another example, radio frequency transponders are not restricted to being read in a line-of-sight manner. A further unique advantage over other identification systems is that several RFID transponders may be read at one time.

One important consideration in a radio frequency identification system is the range at which the radio frequency transponder may be read. Past methods used to increase the range of a radio frequency transponder included increasing the power of the interrogating signal. This necessitated a greater use of energy. Increasing the energy of the interrogating signal may involve adding additional and more costly components to an RF transmitter-receiver unit. This may prove costly not only to manufacture, but also to utilize in its intended environment. Additionally, in some instances, it might be desirable to selectively orient the field-of-view of a radio frequency transponder relative to an interrogating source, receiver, or the like. For example, the radio frequency transponder might be relatively oriented so that it would respond to only one of two interrogating sources.

Consequently, it would be advantageous to provide a radio frequency transponder system with an increased effective range and/or a system that is capable of providing a radio frequency transponder with a selective field-of-view in a cost effective and efficient manner.

SUMMARY OF THE INVENTION

It is the intention of the present invention to provide an improved radio frequency transponder system with a reflector which increases the effective range of the radio frequency transponder so that the radio frequency transponder may be utilized over an increased distance, and/or a system capable of requiring selective relative orientation and/or providing selective reflective coupling of radiated energy during communication between system components.

A radio frequency identification transponder assembly in accordance with a first aspect of the invention includes a radio frequency transponder disposed next to a reflector. The reflector may comprise any sort of radio frequency reflective material. The reflector may be formed with the radio frequency transponder at its focus region so as to enhance the reception of transmitted energy (for power or information transfer), and/or the transmission of signal energy by the radio frequency transponder. In this manner, the reflector provides increased range of useful energy transfer between the radio frequency transponder and a base station or the like. For example, the reflector may increase the effective range by focusing an increased reception area of the reflector to a radio frequency transponder so as to increase the distance at which the radio frequency transponder may receive an interrogating signal or other energy, and/or transmit data.

In accordance with a second aspect of the present invention, a radio frequency transponder is disposed next to a reflector that may selectively orient the radio frequency transponder with respect to a base station or the like. For example, a reflector may be formed or positioned relatively so as to supply a radio frequency transponder with an interrogating signal from one source while excluding a signal from a second source.

In accordance with a third aspect of the present invention, a reflector is capable of selectively reflecting a radio frequency wave to and from a radio frequency transponder. In one example, the reflector is capable of selectively reflecting a radio wave so as to reflect a wave from one specific source to the transponder yet exclude transmissions from other sources.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF PREFERRED EMBODIMENTS

Figure 1A:
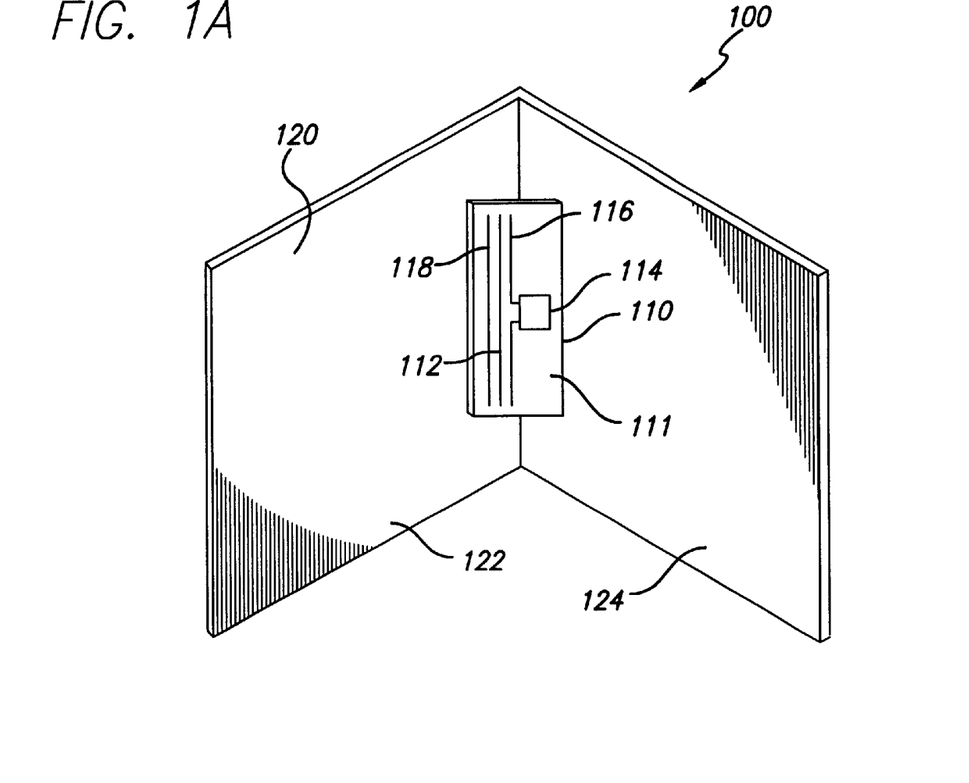
FIG. 1A is an isometric view of a radio frequency identification transponder assembly having a v-shaped or corner reflector.

Reference will now be made in detail to the presently preferred embodiments of the invention, examples of which are illustrated in the accompanying drawings. Referring now to FIG. IA, an exemplary embodiment of a radio frequency identification transponder assembly 100 is shown. A radio frequency transponder identification assembly 100 includes a radio frequency transponder 110 which includes an antenna 116 and a radio frequency integrated circuit 114 (RFIC). The RFIC 114 may include a radio frequency processing section (typically referred to as a front end) and a signal processing section. The front end may be any known front end design used with an antenna 116. Examples of front ends are known in the art. The signal processing section may include logic circuits and memory for processing and storing information.

Figure 2:
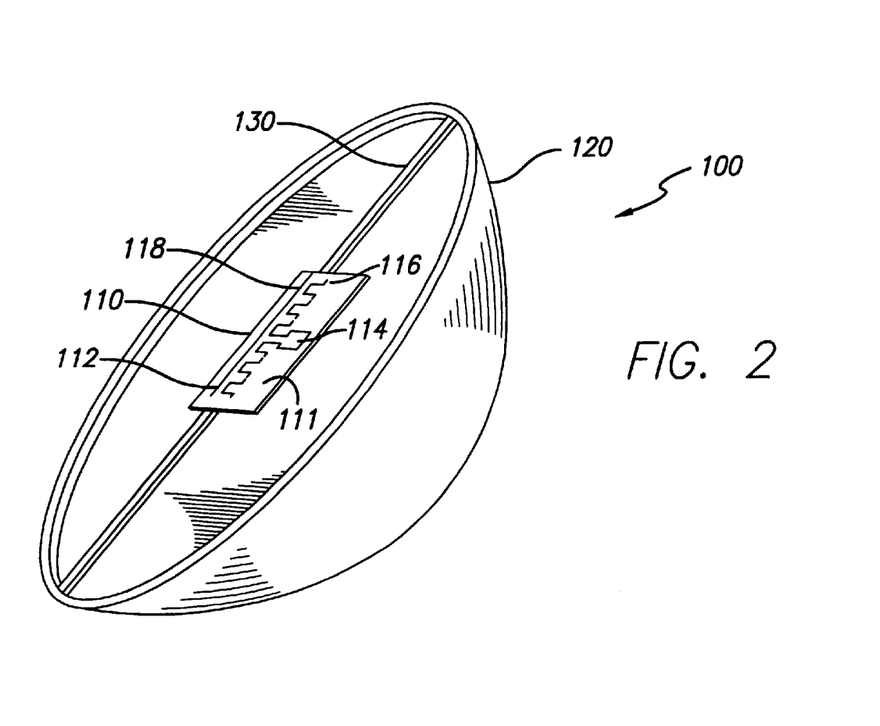
FIG. 2 is an isometric view of a radio frequency identification transponder assembly having a dish reflector.
Figure 3:
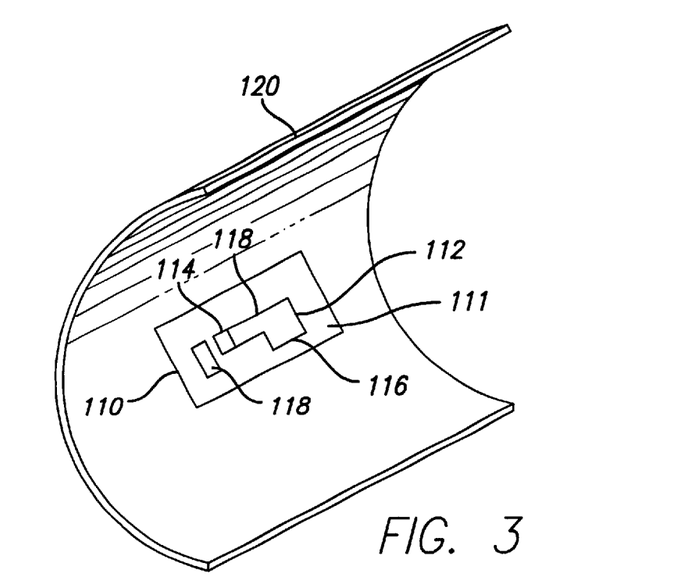
FIG. 3 is an isometric view of a radio frequency identification transponder assembly having cylindrical reflector.
Figures 4, 5:
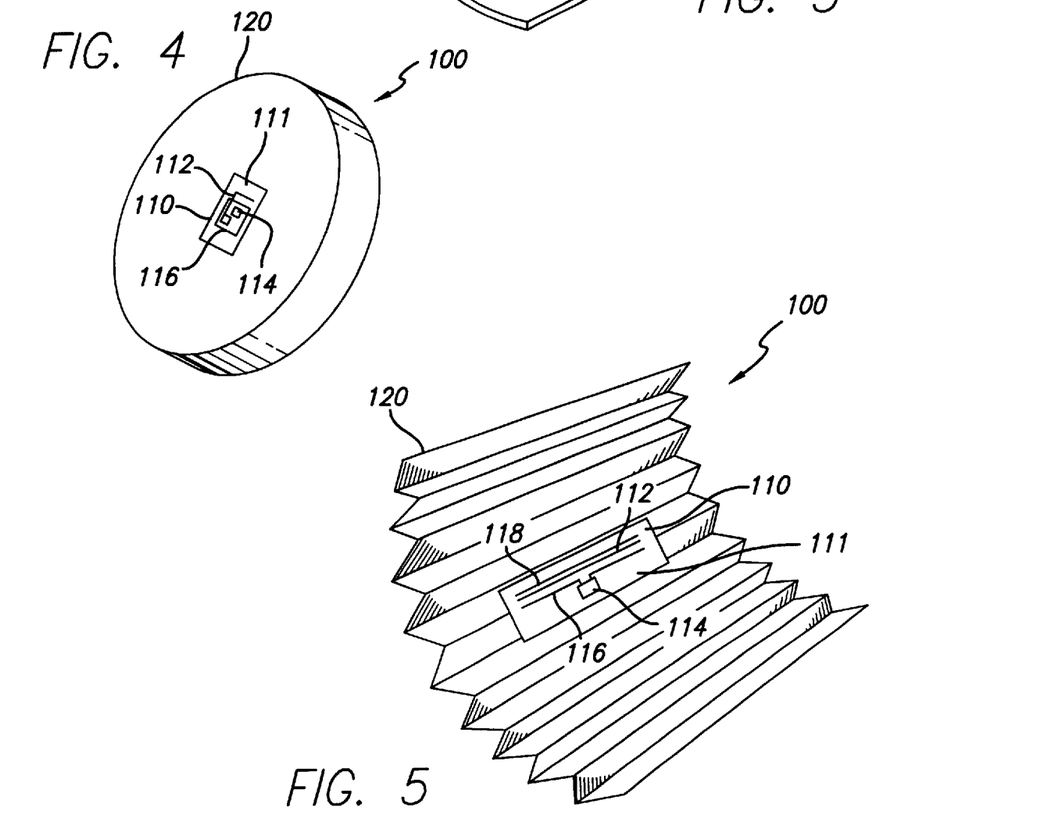
FIG. 4 is an isometric view of a radio frequency identification transponder assembly having a shaped reflector.
FIG. 5 is an isometric view of a radio frequency identification transponder assembly having a corrugated reflector.
Figure 10A:
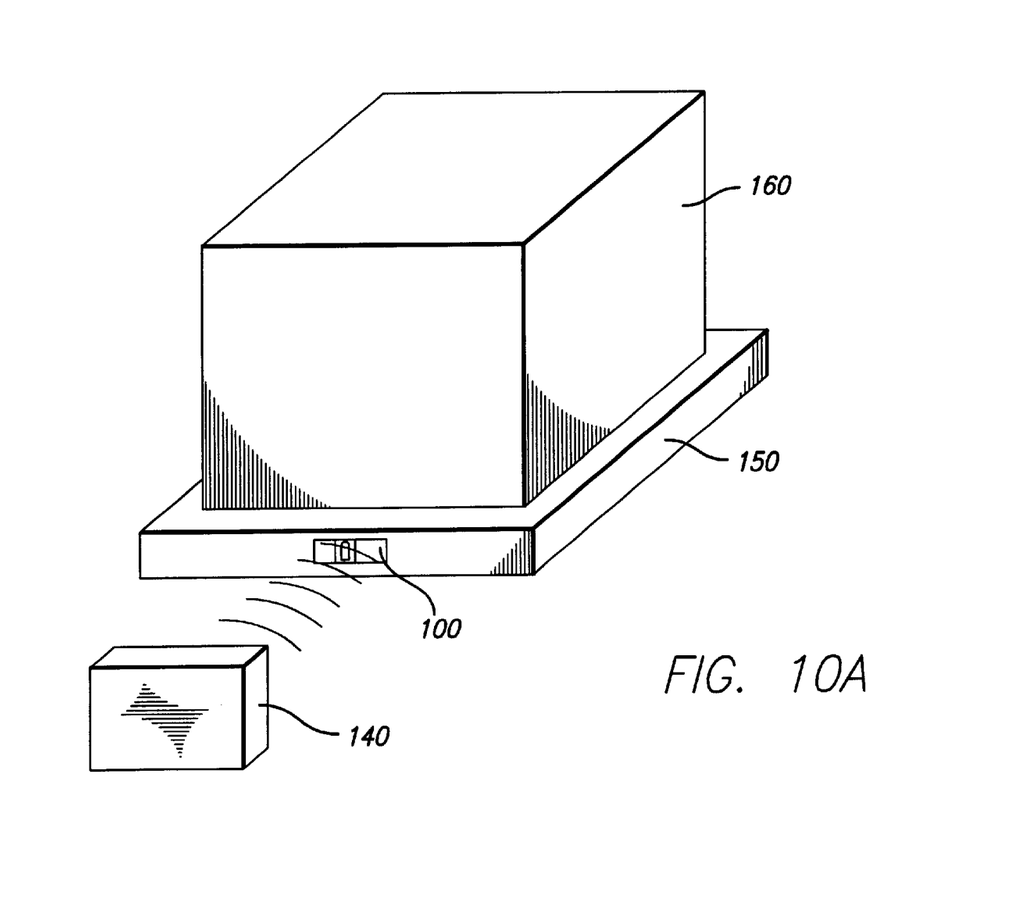
FIG. 10A is a view of an exemplary embodiment of a radio frequency identification transponder assembly wherein a radio frequency transponder and reflector is disposed in a pallet so as to have increased range.

The RFIC 114 may be coupled to an antenna 116 which provides a means, such as an aperture (not shown), by which the radio frequency transponder may detect an interrogating field, and/or, where appropriate, a programming field. An antenna circuit 112 may include impedance matching circuits 118 (i.e. microstrip lines, or the like). These circuits 118 which are connected to the RFIC 114, may interconnect the RFIC 114 to the radiating element 116 of the antenna circuit 112 to carry RF signal and energy from the RFIC 114 to the antenna 116 and/or from the antenna 116 to the RFIC 114. The antenna 116 may also serve as the means of transmitting a response to interrogation from a base station 140 (FIG. 10A). Depending on the properties desired, the antenna circuit 112 of the present invention may employ any of a large number of different antennas 116 having various configurations and geometries (i.e. monopole, dipole, folded dipole. loop, slot, coil, spiral, meander, patch, etc.). For example, as shown in FIG. 1A and 5, the antenna 116 may exemplify a simple dipole antenna. Alternatively, as shown in FIG. 2, the antenna may characterize a meander dipole antenna, wherein the dipole antenna is bent in a "meander" pattern reducing the antenna's overall length. Additionally, as shown in FIG. 3, the antenna 116 may epitomize a patch antenna. Furthermore, as shown in FIG. 4, the antenna 116 may be formed as a spiral. In an exemplary embodiment, the antenna consists of a thin pattern (typically 18 to 35 micron thick) formed of a conductive metal such as copper. This pattern may be formed by plating or adhering or screening a thin layer of copper (or other conductive metal) onto a substrate 111. The layer may then be etched to form the specific geometric configuration of the antenna. Similarly, one or more impedance adjustment elements may be integrally formed on the substrate 111 to modify the impedance of the antenna circuit. The impedance adjustment elements may be, for example, lumped circuit elements, distributed microwave circuit elements, or parasitic elements that are electromagnetically coupled to the antenna (i.e., not electrically connected).

As shown in FIG. 1A, the radio frequency identification transponder assembly 100 may include a reflector 120 disposed proximally to a radio frequency transponder 110. The reflector 120 is suitable for collecting and focusing radio frequency energy to and from an antenna circuit 112 so that the gain of the antenna circuit 112 is increased and the operating range of the radio frequency transponder 110 is also increased. In this embodiment, the reflector 120 includes a first reflecting portion 122 and a second reflecting portion 124 for focusing radio frequency waves. The larger the size of the reflector, the greater the read distance as shown through the following. The read distance (R) of a radio frequency transponder assembly is proportion to the directivity (D).

$$R D$$

Further, the directivity of the radio frequency transponder assembly may be determined from the formula:

$$D = 4\pi A/\lambda 2$$

where A is the cross-sectional area of the reflector, and k is the wavelength of the system. Thus, $$R A$$

Thus, the read distance of the radio frequency transponder is proportional the to cross-sectional area of the reflector. In other words, to increase the read area of a radio frequency transponder assembly, the reflector area may be increased. However, the greater the distance, the greater the necessity of the correct alignment of the source of the radio waves with the reflector. For example, if a larger reflector is utilized to increase the read distance of a radio frequency transponder, the more accurately the interrogator must be placed in front of the reflector.

Figure 1B:
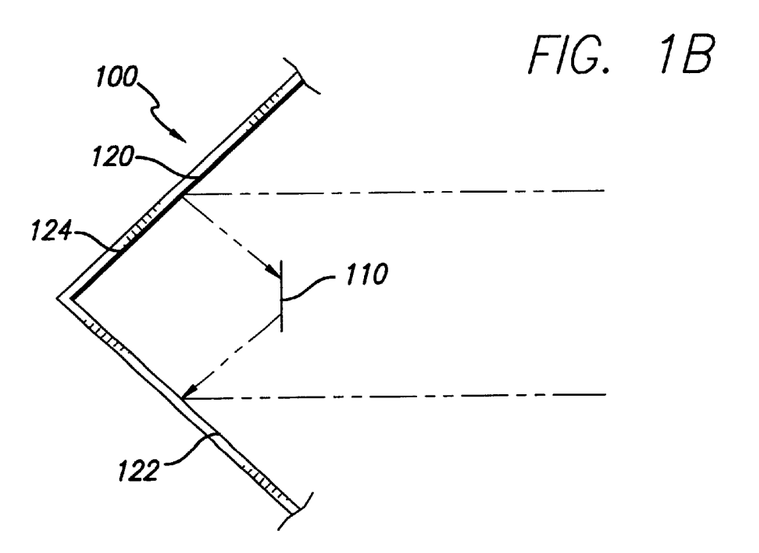
FIG. 1B is a top plan view of the radio frequency transponder assembly shown in FIG. 1A.

In FIG. 1B, a radio frequency transponder 110 is disposed near a reflector 120 so that the reflector 120 may focus radio waves, represented by arrows in the illustration. Radio waves are concentrated so that the radio frequency transponder 110 may have an increased operable range. In this way, the radio frequency identification transponder assembly 100 may increase the energy received by the radio frequency transponder 110. Additionally, the reflector 120 may operate to increase the transmitting range of the radio frequency transponder 110. The radio frequency transponder 110, by receiving focused energy from the reflector 120 may modulate a more powerful radio wave. The reflector 120 may also operate so as to focus energy radiated from the radio frequency transponder 110 toward a base station 150 (FIG. 10A) to increase the transmittal range of the transponder 110.

Figure 1C:
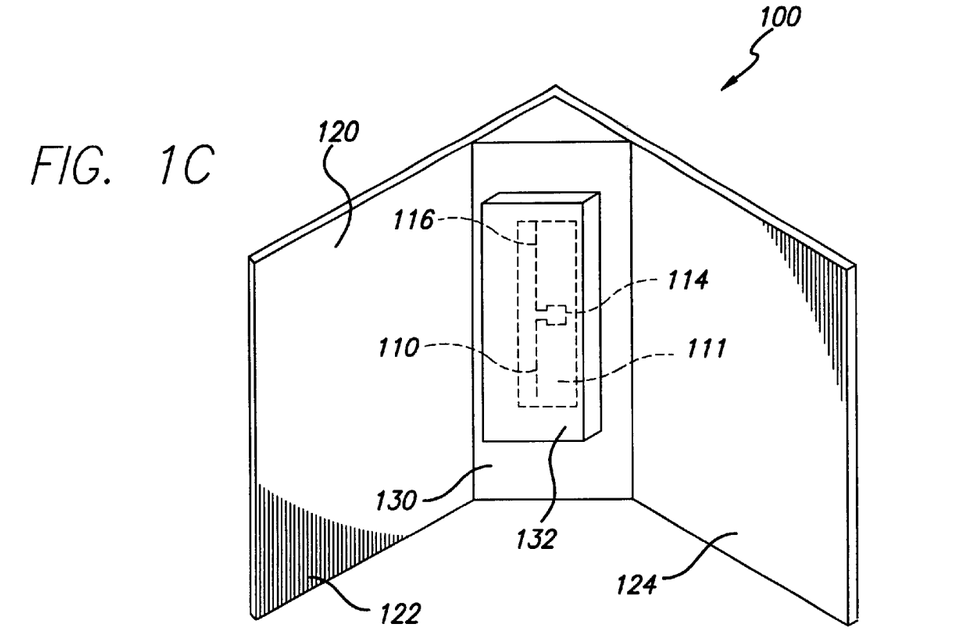
FIG. 1C is an isometric view of a radio frequency identification transponder assembly shown in FIG. 1A, further including a dipole over ground plane feed.

Referring now to FIG. 1C, an exemplary embodiment of a radio frequency identification transponder assembly 100 is shown wherein a radio frequency transponder 110 having a dipole over ground plane (DOG) antenna structure 116 is shown. The DOG structure allows the radio frequency transponder to be placed on metal or RF absorbing surfaces and to be read over increased ranges. The radio frequency transponder 110 preferably includes an RF integrated circuit 114 (RFIC) and dipole antenna 116 configured to communicated with an RF system. The RFIC 114 preferably includes RF modulator circuits, logic circuits, and memory mounted to a substrate 111 and bonded to a dipole 116. A base plate may be attached to a metal or RF absorbing surface, in this instance a support 130, to form a conducting ground plane. The RF transponder may include a dipole 116 which is held at a distance from the conducting ground plane 130 by a support 132 attached to the base plate. The support 132 may comprise a housing which encloses the radio frequency transponder 110 to protect it from environmental contaminants. The support is mounted next to a reflector 120 so as to further increase the effective range of the radio frequency transponder. The reflector 120 may consist of two parts, a first reflector 122 and a second reflector 124 to focus radio frequencies to and from the radio frequency transponder. For example, by focusing radio frequencies, the radio frequency transponder 110 may be interrogated by a base station (FIGS. 8 and 9) over a greater distance. Furthermore, the radio frequency transponder 110 may also transmit over an increased distance by focusing the energy from the radio frequency transponder 110 towards a base station. This exemplary embodiment may further increase the range at which the radio frequency transponder may be read and transmit by combining the DOG antenna structure 116 with the reflector 120.

Referring now to FIG. 2, an exemplary embodiment of the present invention is shown wherein a reflector 120 is formed as a dish. In this example, a radio frequency transponder 110 is disposed on a support 130 so as to be able to receive and transmit focused radio frequency waves from a reflector 120 formed as a dish. It should be realized that the dish may have a paraboloidal, ellipsoidal, hyperbolic, hyperboloidal, spherical, spheroid, or any other shape contemplated by persons of ordinary skill in the art. In this embodiment, the radio frequency transponder 110 may include a radio frequency integrated circuit 114 connected via an antenna circuit 112, which may include an impedance matching circuit 118, to a meander dipole antenna 116. A meander dipole antenna 116 is bent in a "meander" pattern reducing the antenna's overall length.

Referring now to FIG. 3, an exemplary embodiment of the present invention is shown wherein the reflector 120 is formed in a generally cylindrical shape, being e.g. at least one of parabolic, elliptic, hyperbolic, circular, and curvilinear in cross section. In this example, a radio frequency transponder 110 is disposed on a support 130 so as to be able to receive and transmit focused radio frequency waves from a reflector 120. In this embodiment, the radio frequency transponder 110 may include a radio frequency integrated circuit 114 connected via an antenna circuit 112, which may include an impedance matching circuit 118, to a patch antenna 116.

Referring now to FIGS. 4 and 5, a radio frequency identification transponder 100 including a reflector 120 having a variety of shapes is shown. In FIG. 4, a shaped reflector 120 is shown. The reflector 120 is formed in a substantially elongated shape so as to focus radio waves to interrogate and transmit from a radio frequency transponder 110. The transponder 100 may include an antenna circuit formed in a spiral shape 116 connected to a radio frequency integrated circuit 114. In FIG. 5, a corrugated reflector 120 is shown. In this embodiment, the reflector 120 includes a plurality of ridges so as to focus radio waves to a radio frequency transponder 110. The radio frequency transponder may include an antenna circuit 112 to connect a radio frequency integrated circuit 114 to an antenna 116, in this example formed as a dipole. The antenna circuit may further include an impedance matching circuit 118. It should be realized that a variety of forms may be utilized by the present invention, yet not depart from the scope and spirit thereof. For instance, reflectors may be formed as a lattice, mesh, grid, ribbed, net, inflatable, or any other surface or material and not depart from the invention thereof.

Figure 6:
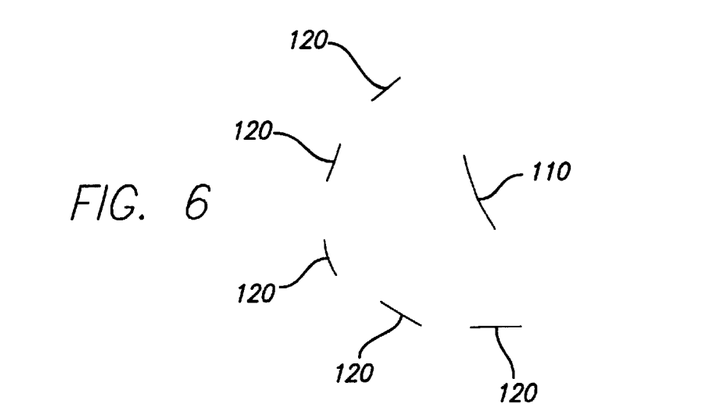
FIG. 6 is an isometric view of a radio frequency identification transponder assembly having a piece-wise linear reflector.
Figures 7, 8:
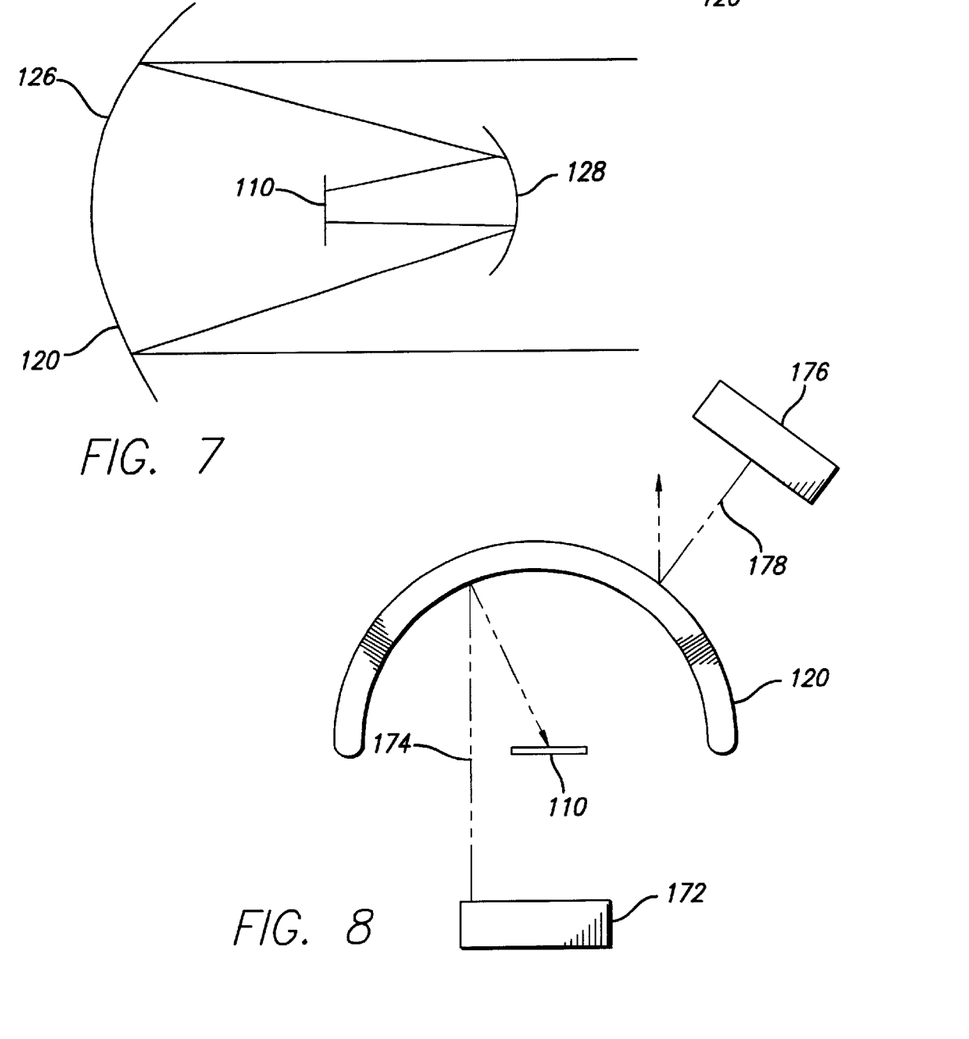
FIG. 7 is an isometric view of a radio frequency identification transponder assembly having multiple reflectors.
FIG. 8 is a view of a radio frequency identification transponder assembly including a dish reflector oriented so as to reflect signals from a first base station and exclude radio frequency waves from a second.

Referring now to FIGS. 6 and 7, a plurality of reflectors are shown. In FIG. 6, a plurality of reflectors 120 are disposed proximally to a radio frequency transponder 110 in a piecewise linear fashion. Each reflector may be capable of reflecting radio waves to increase the effective range of the transponder 110. In FIG. 7, multiple reflectors are shown. In this embodiment, the reflectors 120 include a first reflector 126 and second reflector 128 that are capable of being utilized in a compound fashion. By using the reflectors 120 in a compound fashion, a more focused radio wave may illuminate the radio frequency transponder 110 thereby providing more power to the transponder 110.

Referring now to FIG. 8, a reflector 120 may be selectively oriented so as to focus radio waves from a particular source. A reflector 120 is oriented so as to reflect a radio wave 174 from an interrogator 172. However, the reflector is positioned so that a radio wave 178 from a second interrogator 176 is excluded from the radio frequency transponder 110. In this way, the radio frequency transponder may have radio waves from one particular location selectively focused while excluding radio waves from other sources. This embodiment may be particularly useful in environments where there are a plurality of radio wave sources. In this manner, a particular source 172 may be focused, yet another extraneous source 176 is excluded from the transponder 110.

Figure 9:
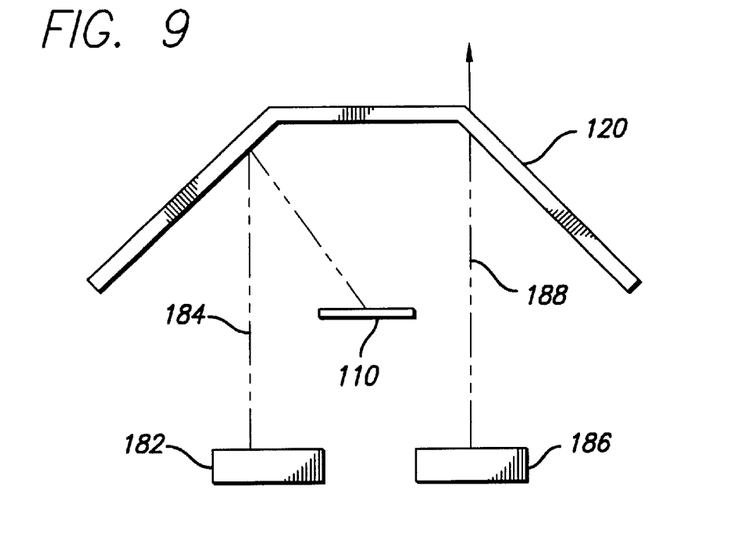
FIG. 9 is a view of a radio frequency identification transponder assembly including a planar reflector wherein the planar reflector is comprised of a reflective material capable of selectively reflecting.

Referring now to FIG. 9, a reflector 120 composed of a frequency selective material is shown. In this embodiment, a reflector 120 is formed of a frequency selective material so that radio waves 184 from a first source 182 are focused toward a radio frequency transponder 110 while radio waves 188 from a second source 186 are not reflected. The frequency selective material may operate so that it will only reflect certain wavelengths while allowing other wavelengths to pass through the medium, as shown in FIG. 9. The material may operate to absorb certain wavelengths while allowing other wavelengths to pass, or any other method of frequency selection, such as polarization, contemplated by a person of ordinary skill in the art.

Figure 10B:
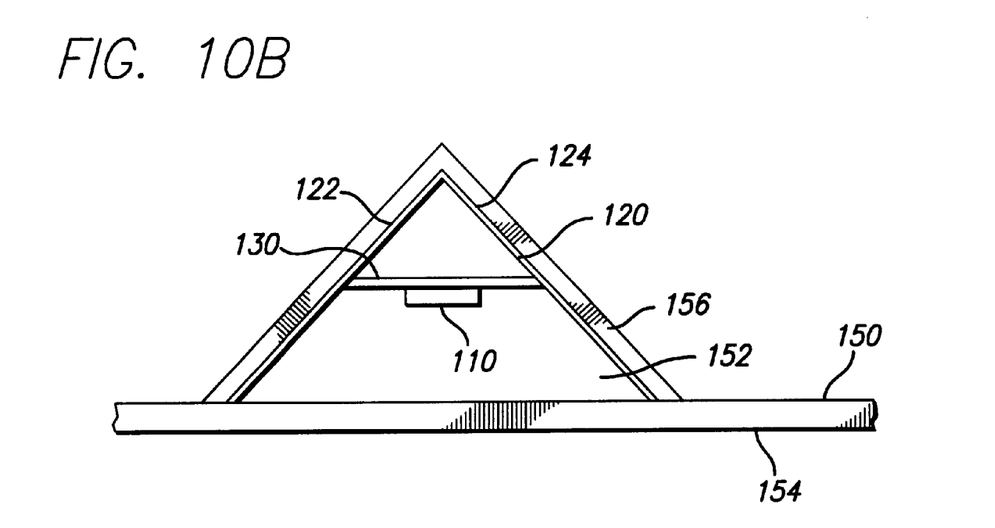
FIG. 10B is an expanded view of FIG. 10B, showing a radio frequency transponder disposed proximally to a reflector molded in a pallet.

Referring now to FIGS. 10A and 10B, an exemplary application of the radio frequency identification transponder assembly of the present invention in a radio frequency identification (RFID) system is shown. A radio frequency identification transponder assembly 100 is associated with an item 160 to be identified, inventoried, tracked, etc. For example, as shown in FIG. 10A, the radio frequency transponder assembly 100 may be disposed on or in a pallet 150 supporting the item 160. Alternately, the radio frequency transponder 100 could be attached to the item, disposed within a container holding the item, etc. Information such as inventory information, routing information, etc. is programmed into the memory of the radio frequency identification transponder assembly. This information may, for example, be preprogrammed into transponder assembly 100, or, written to the transponder assembly 100 after it is associated with the item 160.

As shown in FIG. 10A, the RFID system includes a radio frequency transmitter-receiver unit (typically referred to as a base station or interrogator) 140. The interrogator 140 may be fixedly located (a central base station), hand-held (i.e., a hand-held portable data collection terminal or computer), or mounted to a vehicle (i.e., a forklift, delivery truck, etc.). The interrogator 140 includes a radio frequency (RF) transmitter or transceiver and an antenna configured to generate a radio frequency interrogation field suitable for interrogating the radio frequency identification transponder assembly 100. The radio frequency transponder assembly 100 modulates and back-scatters the interrogation field to provide a response signal comprising encoded data to the interrogator's receiver. The data encoded in the response signal may be as simple as 1-bit (the response indicates that the tag 504 is present or absent) or the data may be a serial stream providing a substantial amount of data to the interrogator 502. Operating frequencies of such systems typically range from 13 MHz to 6 GHZ. Turning now to FIG. 10B, the radio frequency transponder 100 may be positioned in a cavity 152 formed in a (e.g., plastic, wood, etc.) supporting device, container, or crate, such as pallet 150, on or in which an item or items 160 (FIG. 10A) is shipped or stored. Such a chamber 152 may, for example, be formed between one or more internal supports 156 and an exterior wall 154 of the pallet 150. Preferably, the one or more supports 156 forming the chamber 156 are formed so that they have the characteristic shape of the reflector 120 (e.g., a paraboloidal, ellipsoidal, hyperboloidal, or spherical dish reflector; a parabolic, elliptic, hyperbolic, circular, or curvilinear generally cylindrical reflector; a corner reflector, etc.). For example, as shown in FIG. 10B, wherein the reflector 120 is a corner reflector, support 156 may be formed to have a "V" shape conforming to and supporting side portions 122 & 124 (see also FIGS. 1A, 1B, and 1C). In this case, side portions 122 & 124 may be formed by trimming and bending a sheet of a conducting metal to have the proper size and shape and inserting the sheet within the cavity 152. Alternately, a radio frequency transponder assembly 100 may be fitted into an existing chamber in the pallet 150.

Various modifications may be made in and to the above described embodiments without departing from the spirit and scope of the invention. For example, various modifications and changes may be made in the configuration of the radio frequency transponder such as reconfiguration of the antenna geometry, circuit chip construction, substrate material and geometry, and the like. Further, use of the RFID tag is directed to a wide variety of applications including, but not limited to, airline baggage (i.e., luggage, freight, and mail), postal service, manufacturing, inventory control, personnel security, and the like.

It is believed that the methods and apparatus of the present invention and many of its attendant advantages will be understood from the foregoing description, and it will be apparent that various changes may be made in the form, construction and arrangement of the components thereof without departing from the scope and spirit of the invention or without sacrificing all of its material advantages. The forms hereinbefore described being merely exemplary and explanatory embodiments, it is the intention of the following claims to encompass and include all such changes.

The following patent applications are hereby incorporated herein by reference in their entireties as disclosing further embodiments which may be associated with each of the reflector systems herein, and for providing further information concerning implementation of the illustrated embodiments: international application no. PCT/US98/23121 filed Oct. 30, 1998; and U.S. application Ser. No. 09/188,089 filed Nov. 6, 1998, and U.S. Pat. Nos. 09/191,641, 09/191,642, 09/192,052 and 09/192,063, all filed Nov. 13, 1998.

Each antenna configuration illustrated herein may be operatively associated with each of the reflector systems illustrated herein, for example.

What is claimed is:

1. A radio frequency identification transponder assembly, comprising:
   a radio frequency transponder including an antenna circuit having an aperture which detects energy from an electromagnetic field, said radio frequency transponder comprising a substrate and a radio frequency circuit mounted to said substrate, wherein said antenna circuit is integrally formed on said substrate and bonded to said radio frequency circuit;
   a reflector disposed proximally to said radio frequency transponder, said reflector suitable for collecting and focusing energy from the electromagnetic field into the aperture so that the gain of said antenna circuit is increased.

2. The radio frequency identification transponder assembly of claim 1, wherein said reflector comprises a substantially "V" shaped corner reflector.

3. The radio frequency identification transponder assembly of claim 1, wherein said reflector comprises a dish reflector.

4. The radio frequency identification transponder assembly of claim 3, wherein said dish reflector is generally at least one of paraboloidal, ellipsoidal, hyperboloidal, spherical, and irregular in shape.

5. The radio frequency identification transponder assembly of claim 1, wherein said reflector comprises a generally cylindrical reflector.

6. The radio frequency identification transponder assembly of claim 5, wherein said generally cylindrical reflector is generally at least one of parabolic, elliptic, hyperbolic, circular, and curvilinear in cross section.

7. The radio frequency identification transponder assembly of claim 1, wherein said reflector comprises a piecewise linear reflector.

8. The radio frequency identification transponder assembly of claim 1, wherein said reflector comprises a corrugated reflector.

9. The radio frequency identification transponder assembly of claim 1, wherein said reflector comprises a frequency selective surface for collecting and focusing electromagnetic waves of selected frequencies.

10. A radio frequency identification transponder assembly, comprising:
    a radio frequency transponder including an antenna circuit; and
    a reflector disposed proximally to said radio frequency transponder; said reflector being suitable for collecting and focusing radio frequency energy to and from said antenna circuit so that the operating range of said radio frequency transponder is extended;
    wherein said radio frequency transponder further includes:
      a substrate, and
      a radio frequency circuit mounted to said substrate, wherein said antenna circuit is integrally formed on said substrate and bonded to said radio frequency circuit.

11. A radio frequency identification system, comprising:
    a reader/interrogator for generating a radio frequency field suitable for interrogating a radio frequency transponder;
    a radio frequency transponder including an antenna circuit having an aperture which detects energy from the radio frequency field; and
    a reflector disposed proximally to said radio frequency transponder, said reflector suitable for collecting and focusing energy from the radio frequency interrogation field into the aperture so that the gain of said antenna circuit is increased and the operating range of said radio frequency transponder is extended;

wherein said radio frequency transponder further includes:
a substrate, and
a radio frequency circuit mounted to said substrate, wherein said antenna circuit is integrally formed on said substrate and bonded to said radio frequency circuit.

12. A radio frequency identification transponder assembly, comprising:
a radio frequency transponder including an antenna circuit; and
a reflector disposed proximally to said radio frequency transponder, said reflector being adapted for collecting and focusing radio frequency energy to and from said antenna circuit so that the operating range of said radio frequency transponder is extended;
wherein said radio frequency transponder further comprises a dipole-overground-plane transponder comprising:
a substrate having a dipole integrally formed thereon;
a radio frequency circuit mounted to said substrate and coupled to said dipole;
a base plate forming a conducting ground plane; and
a support attached to said base plate for retaining said substrate so that said dipole is held at a distance from said conducting ground plane.

13. A radio frequency identification transponder assembly, comprising:
a radio frequency transponder including an antenna circuit having an aperture which detects energy from an electromagnetic field;
a reflector disposed proximally to said radio frequency transponder, said reflector adapted for collecting and focusing energy from the electromagnetic field into the aperture so that the gain of said antenna circuit is increased;
wherein said radio frequency transponder comprises a dipole-over-ground-plane transponder comprising:
a substrate having a dipole integrally formed thereon;
a radio frequency circuit mounted to said substrate and coupled to said dipole;
a base plate forming a conducting ground plane; and
a support attached to said base plate for retaining said substrate so that said dipole is held at a distance from said conducting ground plane.

14. A radio frequency identification system, comprising:
a reader/interrogator for generating a radio frequency field suitable for interrogating a radio frequency transponder;
a radio frequency transponder including an antenna circuit having an aperture which detects energy from the radio frequency field; and
a reflector disposed proximally to said radio frequency transponder, said reflector suitable for collecting and focusing energy from the radio frequency interrogation field into the aperture so that the gain of said antenna circuit is increased and the operating range of said radio frequency transponder is extended;
wherein said radio frequency transponder comprises a dipole-over-ground-plane transponder comprising:
a substrate having a dipole formed thereon;
a radio frequency circuit mounted to said substrate and coupled to said dipole;
a base plate forming a conducting ground plane; and
a support attached to said base plate for retaining said substrate so that said dipole is held at a distance from said conducting ground plane.

* * * * *